United States Patent
Booth et al.

(10) Patent No.: US 6,247,786 B1
(45) Date of Patent: Jun. 19, 2001

(54) DYNAMIC PASS BUFFER SIZING

(75) Inventors: James Ronald Booth, Nicholasville; Martin Geoffrey Rivers, Lexington, both of KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/427,225

(22) Filed: Oct. 26, 1999

(51) Int. Cl.$^7$ .......................................................... B41J 2/15
(52) U.S. Cl. ................... 347/40; 345/12; 358/116
(58) Field of Search ................... 358/1.16, 1.17, 358/1.18, 502, 1.8, 1.14, 404; 347/12, 13, 40, 41, 42, 43, 10

(56) References Cited

U.S. PATENT DOCUMENTS

| | | |
|---|---|---|
| 5,347,617 | 9/1994 | Webb et al. . |
| 5,511,890 | 4/1996 | Momose . |
| 5,563,712 | 10/1996 | Nahata . |
| 5,619,233 | 4/1997 | Harrington . |
| 5,696,888 | * 12/1997 | Ikeda ..................................... 358/1.16 |
| 5,760,807 | 6/1998 | Yamazaki et al. . |
| 5,764,867 | * 6/1998 | Sato ..................................... 395/115 |
| 5,816,714 | 10/1998 | Hori . |
| 5,970,222 | * 10/1999 | Gusmano et al. ................... 395/115 |
| 6,028,676 | * 2/2000 | Nakao ................................. 358/1.16 |

* cited by examiner

Primary Examiner—N. Le
Assistant Examiner—Lamson D. Nguyen
(74) Attorney, Agent, or Firm—Andrew S. Neely, Esq.

(57) ABSTRACT

Data describing an image to be printed on a print medium is transferred to an ink jet print head. The print head has n number of nozzles in a vertical array for sequentially ejecting vertical columns of ink droplets onto the print medium as the print head scans horizontally across the print medium. The vertical columns of ink droplets ejected during a single pass of the print head collectively comprise a swath of the image. As the data is received from a data source, a required memory space is determined which would accommodate a portion of the data describing a swath of the image to be printed using all n of the nozzles. A current available capacity of a memory device is determined and the amount of image data received from the host is determined. A portion of the data that describes a swath of the image to be printed using a number m of the nozzles is transferred to the memory device. The number m depends on the minimum of the ratio of current available capacity of the memory device to the required memory space needed to accommodate data required to print a swath using all n of the nozzles and the ratio of the image data received from the host to the amount of image data required to print a swath using all n of the nozzles. The portion of the data that describes the swath of the image to be printed using the m number of the nozzles is transferred from the memory device to the print head. The swath of the image is then printed on the print medium using the m number of the nozzles.

17 Claims, 5 Drawing Sheets

DYNAMIC PASS BUFFER SIZING

FIELD OF THE INVENTION

The present invention is generally directed to mechanism management in an ink jet printer. More particularly, the present invention is directed to adjusting the amount of image data to be printed during a pass of ink jet print heads in an ink jet printer based on the current available capacity of a pass buffer in the printer and the amount of data available from a host computer.

BACKGROUND OF THE INVENTION

Generally, an ink jet printer prints an image on a page by ejecting droplets of ink from one or more vertical columns of nozzles on a print head. The droplets are ejected to form a matrix of dots as the print head passes horizontally across the page. For each dot which makes up the image, there is image data describing which nozzle is to print the dot during a particular pass and describing the horizontal position on the page at which to print the dot. Typically, prior to a pass of the print head across the page, the image data is temporarily stored in a memory location, sometimes referred to as a pass buffer. As the print head makes a pass, the image data is transferred from the pass buffer to the print head.

The amount of image data to be stored in a pass buffer depends on the print resolution (number of dots per inch), the page width, and the number of nozzles on the print head. As the number of nozzles on the print head increases, so does the demand for pass buffer space to store the image data. Since pass buffer capacity is limited by hardware design considerations, depending on the particular characteristics of the image to be printed, it may not be possible to store a full pass of image data in the pass buffer all at once.

One approach to handling the problem of limited pass buffer capacity or limited data available from the host is to load as much image data into the pass buffer as it will hold, or as much data as is available, which may be only a portion of a pass, and then print that portion of the pass using the entire print head height. When the print head has printed the portion of the pass, the print head pauses while the pass buffer is refilled with image data. This approach is problematic because it reduces print quality. To obtain the highest print quality using an ink jet printer, it is important not to stop the print head while printing a page. Pausing the print head within a pass causes mechanical difficulties because the print head must be repositioned precisely when the pass is completed after stopping. Pausing at either margin causes variations in ink drying time. Uneven drying times cause undesirable print defects. Further, pausing the print head is perceptually undesirable to the user.

Therefore, a system is needed for managing image data in the pass buffer of an ink jet printer to prevent pass buffer overflow and to prevent undesirable pauses while printing an image.

SUMMARY OF THE INVENTION

The foregoing and other needs are met by a method for transferring to an ink jet print head data that describes an image, and for printing the image on a print medium. The method is used with a print head having n number of nozzles in a vertical array for sequentially ejecting vertical columns of ink droplets onto the print medium as the print head scans horizontally across the image. The vertical columns of ink droplets ejected during a single pass of the print head collectively comprise a swath of the image. The method includes the steps of receiving the data from a data source, and determining an amount of memory space, such as in a pass buffer, needed to hold the an amount of data required to print a swath of the image using all n of the nozzles. The method determines a current available capacity of a memory device, such as a pass buffer, to be used for storing the data. A $ratio_1$ is calculated according to:

$$ratio_1 = \frac{\text{current available capacity of the memory device}}{\text{memory space needed to hold data required to print a swath using all } n \text{ nozzles}}, \quad (1)$$

and a value ratio is determined according to:

$$ratio = ratio_1. \quad (2)$$

A portion of the data that describes a swath of the image to be printed using a number m of the nozzles is transferred to the memory device, where:

$$m \leq ratio \times n, \text{ for } ratio < 1, \text{ and} \quad (3)$$

$$m = n, \text{ for } ratio \geq 1, \text{ and where} \quad (4)$$

The portion of the data that describes the swath of the image to be printed using the m number of the nozzles is transferred from the memory device to the print head, and the swath of the image is printed on the print medium using the m number of the nozzles.

Thus, for those passes in which the amount of data required to print a full swath using all n of the nozzles is larger than the pass buffer capacity, only a lesser number, m, of the nozzles are used. In this way, the invention ensures that no more data is written to the pass buffer than the pass buffer can hold for the next swath to be printed. This prevents the print head from being forced to stop during or between passes to wait for the pass buffer to reload. By avoiding undesirable pauses in the printing of an image, the invention provides for consistent ink drying times from pass to pass, thus improving the overall printed image quality. Another consequence of this method is that the print head moves continuously, which is more satisfying to the user than a method that causes the print head to make obvious pauses.

Preferred embodiments of the invention can choose to use only a portion of the vertical print head height based upon the amount of data available from the host at the time that the print head completes a pass and is ready to accept data for the next pass. According to these embodiments of the invention, an amount of the image data received from the data source is determined, and a $ratio_2$ is calculated according to:

$$ratio_2 = \frac{\text{amount of image data received from the data source}}{\text{amount of image data required to print a swath using all } n \text{ nozzles}}. \quad (5)$$

In this embodiment, ratio is the lesser of $ratio_1$ and $ratio_2$, and is calculated according to:

$$ratio\ min[ratio_1, ratio_2]. \quad (6)$$

Thus, based on the value of ratio calculated according to equations (2) or (6), a partial pass of the print head can be made using the subset m of the possible n nozzles without pausing the movement of the print head.

In an extreme case where the value of ratio is less than some predetermined minimum value, preferred embodiments of the invention pause the print head motion until either the amount of available memory space or the amount of image data are great enough to cause the value of ratio to be larger than the predetermined minimum.

BRIEF DESCRIPTION OF THE DRAWINGS

Further advantages of the invention will become apparent by reference to the detailed description of preferred embodiments when considered in conjunction with the drawings, which are not to scale, wherein like reference characters designate like or similar elements throughout the several drawings as follows.

DETAILED DESCRIPTION OF THE INVENTION

Figure 1:
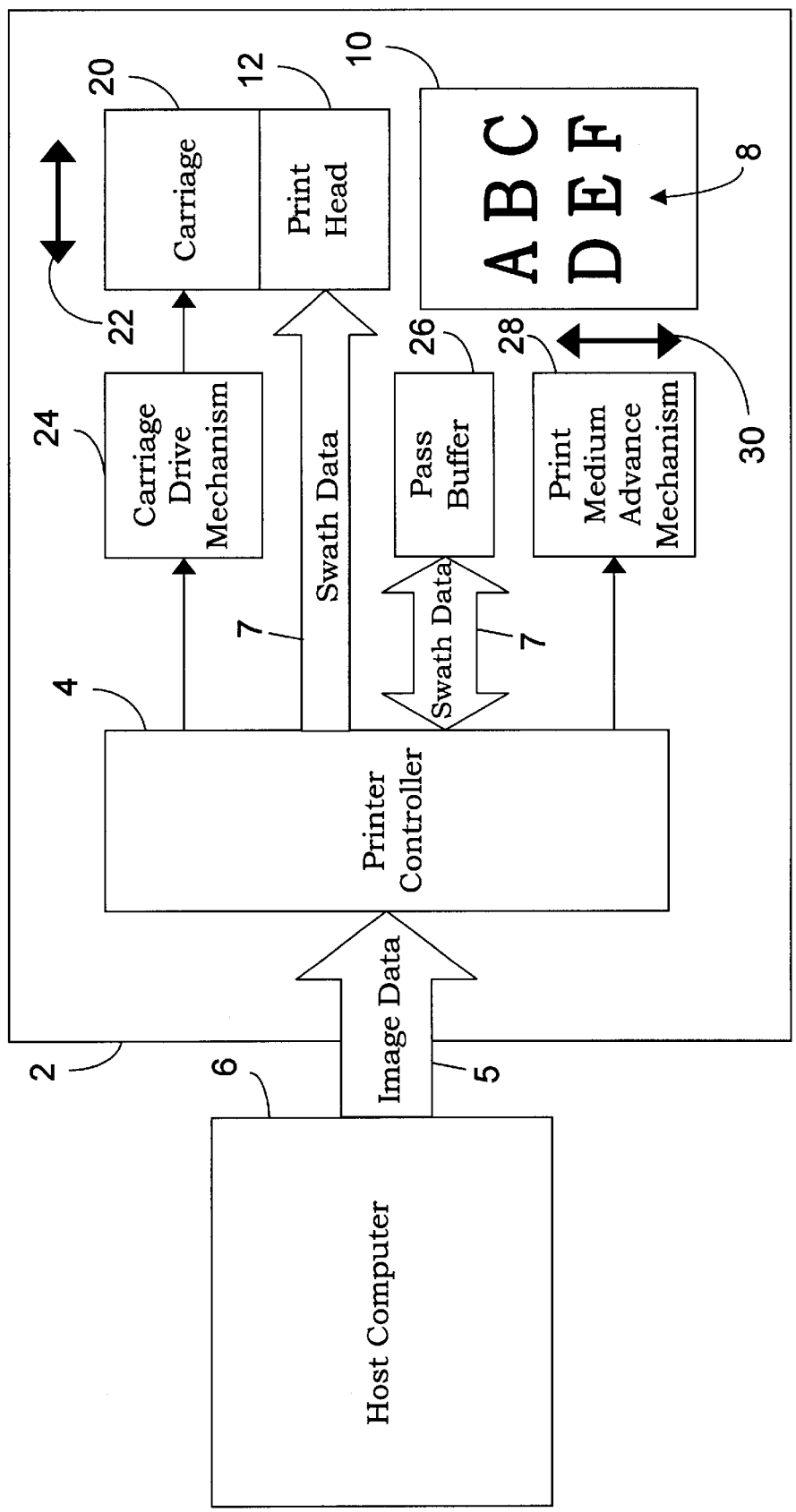
FIG. 1 is a functional block diagram of a system for printing an image on a print medium according to a preferred embodiment of the present invention.

FIG. 1 shows a functional block diagram of an ink jet printer 2 that implements a printing scheme according to the present invention. The printer 2 includes a printer controller 4, such as a digital microprocessor, that receives image data 5, perhaps represented in a Page Description Language (PDL) format, from a host computer 6. The image data contains information describing an image 8 to be printed on a print medium 10, such as paper. Based on the image data 5, the printer controller 4 generates swath data 7, carriage drive commands, and print medium advance commands, which collectively control the printing of the image.

Generally, the image data generated by the host computer 6 describes the image 8 in a PDL format that either directly contains, or that can be processed by the printer to produce a bit-map format. Such a bit-map format represents the image 8 as a collection of pixels, or picture elements, in a two-dimension rectangular coordinate system. For each pixel, the image data indicates whether the pixel is on or off (printed or not printed), and the rectangular coordinates of the pixel on the page. Typically, the host computer 6 "rasterizes" the image data by dividing the image 8 into horizontal rows of pixels, stepping from pixel-to-pixel across each row, and writing out the image data for each pixel according to each pixel's order in the row. The host computer 6 usually compresses the image data before sending it to the printer 2.

Figure 2:
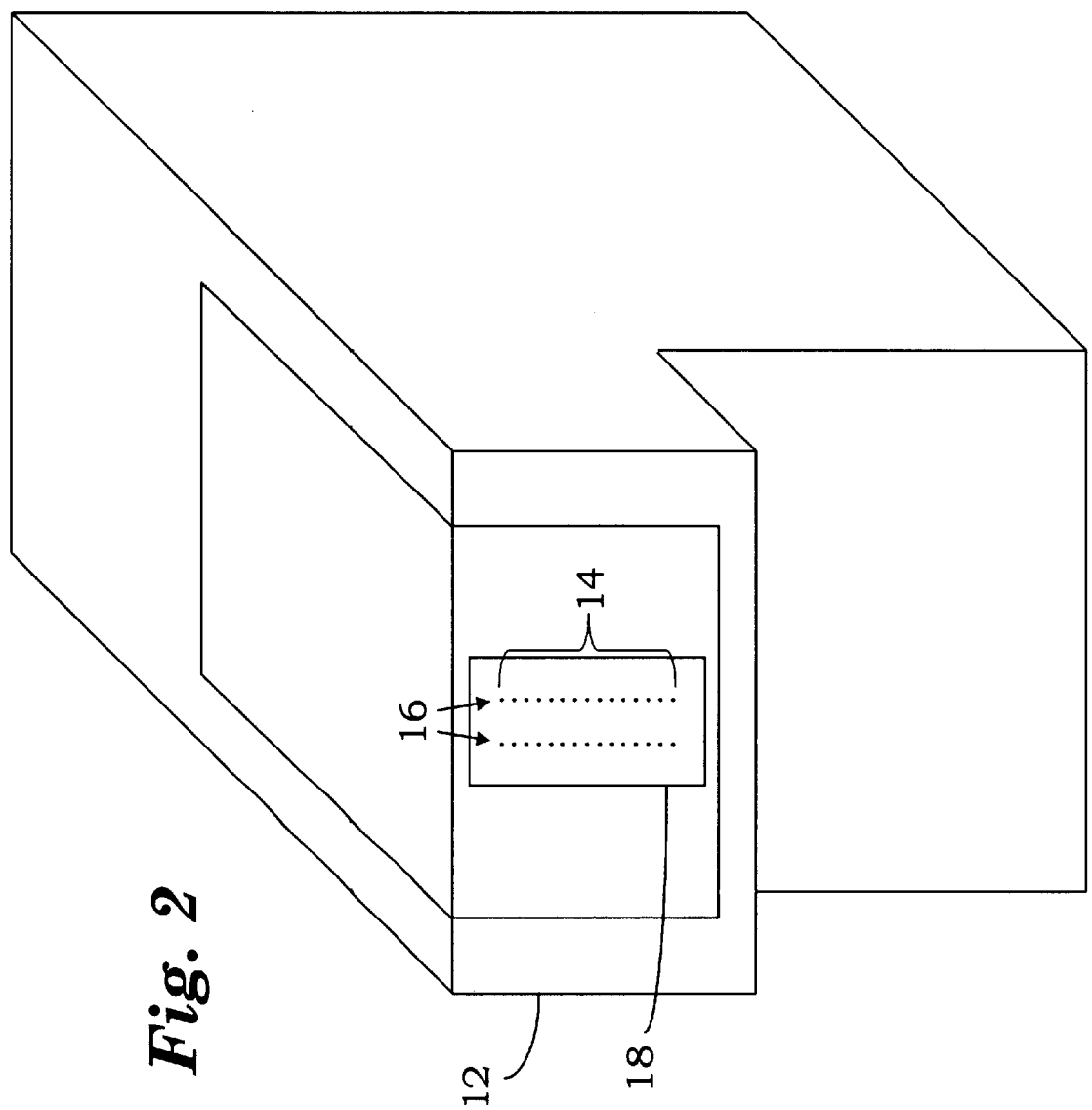
FIG. 2 depicts an ink jet print head according to a preferred embodiment of the present invention.

As shown in FIGS. 1 and 2, the printer 2 includes a print head 12 containing nozzles 14 through which ink droplets are ejected toward the print medium 10. The nozzles 14 are arranged in one or more vertical columns 16 in a nozzle plate 18. Ink is selectively ejected through the nozzles 14 when corresponding heating elements, disposed below the nozzle plate 18, are activated by swath data 7 from the controller 4. Each nozzle 14 in a vertical column 16 prints a row of pixels as the print head 12 scans horizontally across the print medium 10. Several adjacent rows of pixels printed by the nozzles 14 as the print head 12 makes a pass across the print medium 10 covering the area required to print the image 8 are referred to herein as a swath of the image 8. A full swath is printed when all of the nozzles 14 are activated during a pass. A partial swath is printed when only a portion of the nozzles 14 are activated during a pass.

Figure 3:
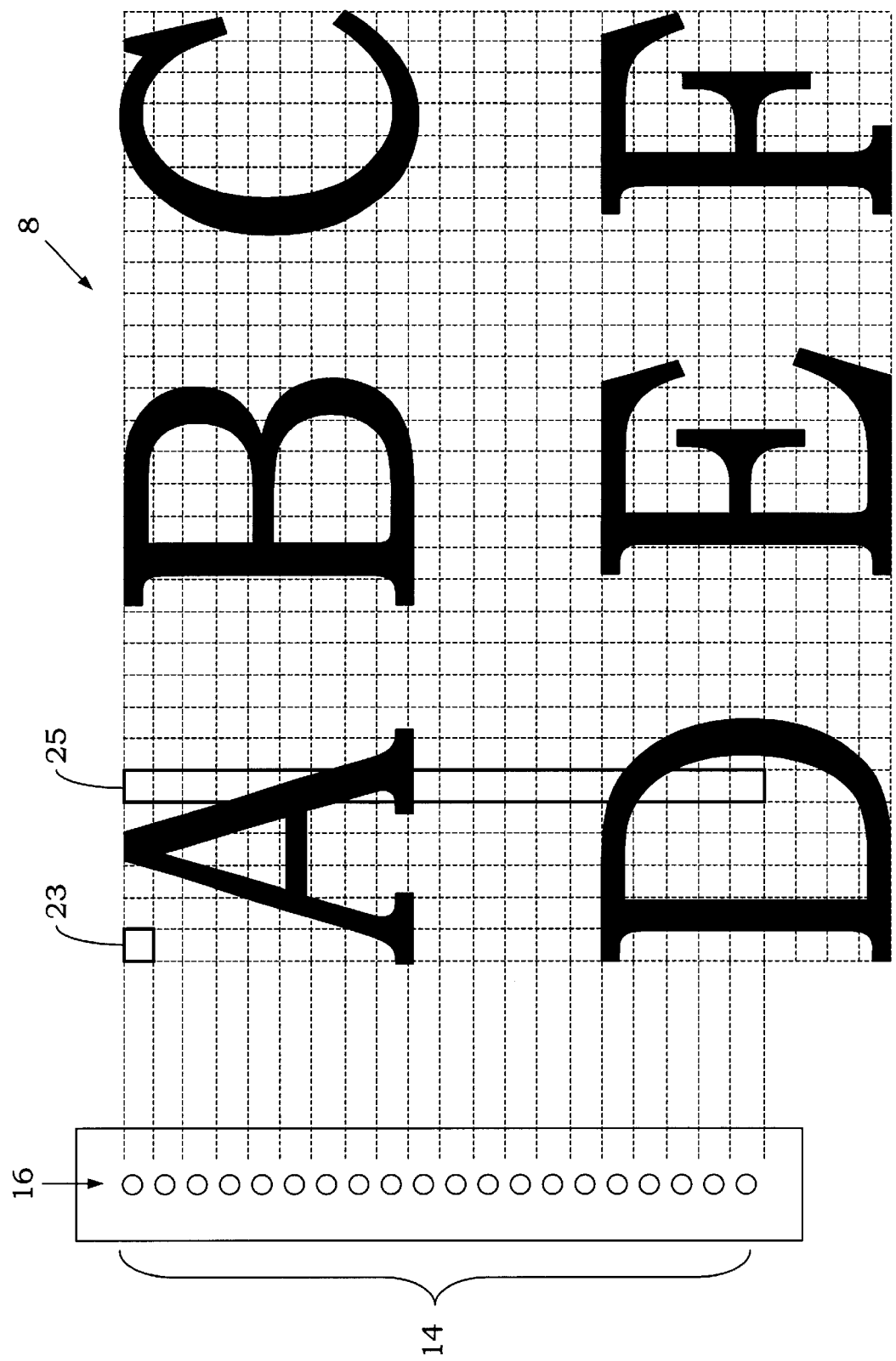
FIG. 3 depicts an image to be printed by a column of ink jet nozzles according to a referred embodiment of the present invention.

The controller 4 generates the swath data 7 based on the image data 5 transferred from the host computer 6. If the image data is compressed, as is typically the case, the controller 4 first decompresses the image data 5. As shown in FIG. 3, the controller 4 then reorders the image data into consecutive vertical slices 25 of pixels 23, where each slice 25 corresponds to the vertical column of nozzles 16 on the print head 12. In the example shown in FIG. 3, there are twenty nozzles 14 in the vertical column 16. Each nozzle 14 prints one of the rows of pixels 23 which make up the image 8. For this example, a full vertical slice 25 of the image 8 is a column of twenty vertically-adjacent pixels 23 in twenty adjacent rows. A full swath of swath data 7 is the combination of all of the full slices 25 across the width of the print medium 10 required to print the desired image 8. For convenience of discussion, the image data that has been rearranged into a swath of consecutive vertical slices 25 is referred to herein as swath data 7. It will be appreciated that the image data 5 and the swath data 7 describe the same image 8 to be printed on the print medium 10, but in different data formats.

Preferably, the printer controller 4 writes the swath data 7 to a pass buffer 26, such as a RAM memory device, where the data resides until it is sent to the print head 12. In the preferred embodiment, the swath data 7 is written into the buffer 26 according to the order of the swaths which make up the image 8, the order of the slices 25 within each swath, and the order of the pixels 23 within each slice 25. The order of the slices 25 in the swath data 7 depends on whether the print head 12 is moving from right-to-left or from left-to-right during the pass.

Referring to FIG. 1, the print head 12 is preferably attached to a carriage 20 that rides on a set of rails, thus enabling horizontal movement of the print head 12 as indicated by the arrow 22. The carriage 20 is moved by a carriage drive mechanism 24 according to carriage drive commands sent from the controller 4 to the carriage drive mechanism 24. Thus, the carriage drive mechanism 24 causes the carriage 20 and the print head 12 to move horizontally across the print medium 10 based on the carriage drive commands. This horizontal movement of the print head 12 across the print medium 10 is also referred to herein as a scan or pass of the print head 12. A full swath of the printed image 8 is formed as the print head 12 makes a pass while all of the nozzles 14 selectively eject ink onto the print medium 10 under control of the swath data 7.

When printing with the ink jet printer 2, it is preferable to print a full swath of the image 8 using all of the nozzles 14 on the print head 12 during each pass. This is the most time-efficient mode of printing, since the print head 12 makes fewer passes across the print medium 10 to completely print the image 8. However, depending on the number of slices 25 per row (determined by the horizontal resolution of the image and the page width) and the number of nozzles 14 within a column 16, the swath data 7 that describes a full swath of the image 8 may be too large to fit in the pass buffer 26. Alternatively, the host computer 6 may not be able to supply image data to the printer 2 at a rate at which the print head 12 can print the data using full swaths.

For example, consider a 300-nozzle print head that prints at 600 dpi on a letter-sized page. For this print head, the amount of swath data 7 describing a full swath would be about 600 Kbytes. If less than 600 Kbytes of memory space is available in the pass buffer at the time that the swath data 7 is transferred to the pass buffer, a memory overflow error would likely occur. In such a situation, the printing of the page is typically aborted. The present invention avoids this problem by dynamically resizing the amount of swath data 7 that is transferred to the pass buffer 26 to be no more than the current available capacity of the pass buffer 26.

Figure 5:
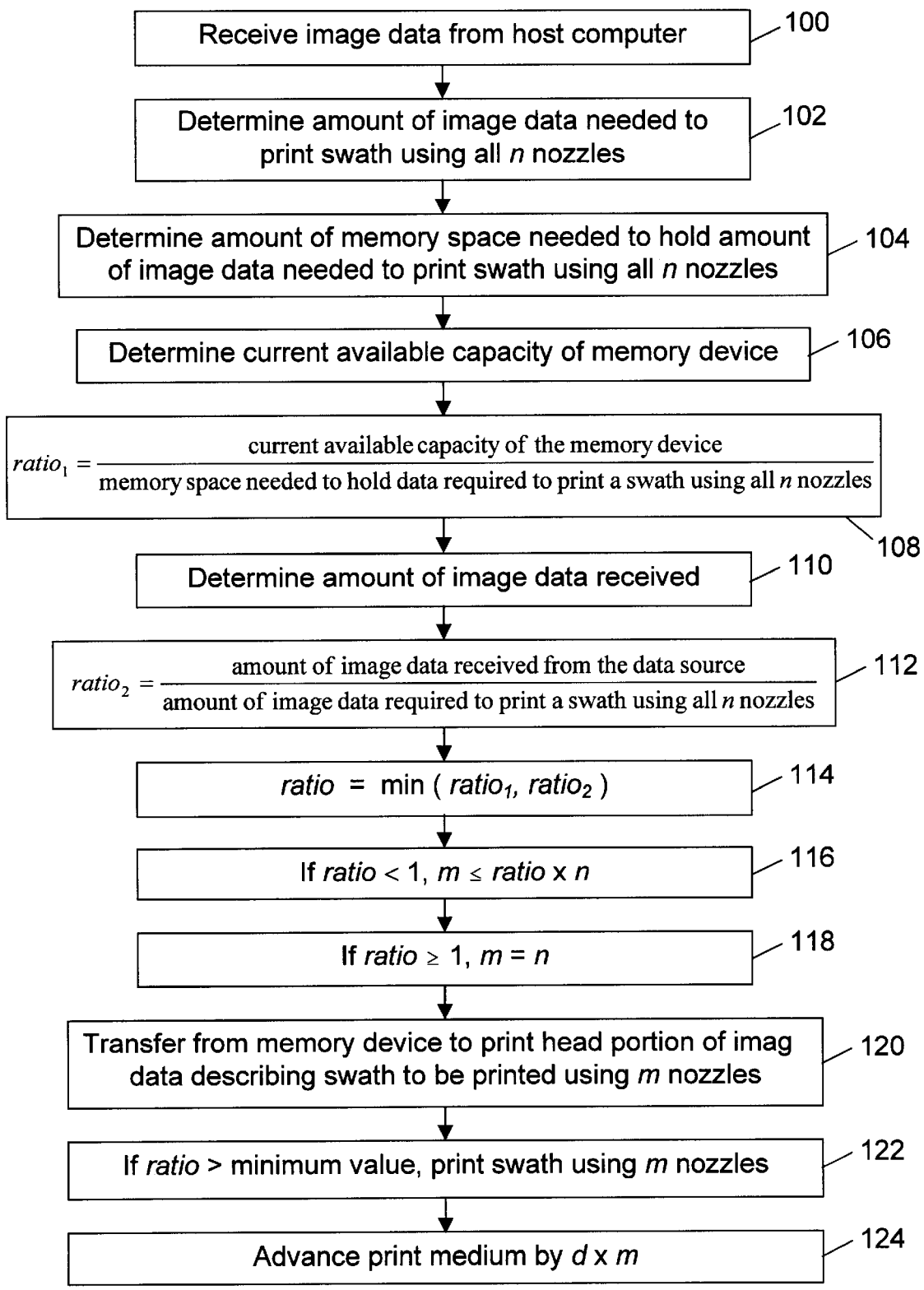
FIG. 5 depicts a flow chart teaching a method of printing an image according to a preferred embodiment of the present invention.

In a preferred embodiment of the invention as shown in FIG. 5, after receiving the image data 5 from the host computer 6 (step 100), and prior to decompressing and rearranging the image data 5 into the swath data 7, the controller 4 estimates the amount of decompressed data that would be required to print a full swath of data (step 102) and how much memory space would be required in the pass buffer 26 to hold the full swath of data (step 104). As discussed above, a full swath of data is the amount of swath data 7 required to activate all of the nozzles 14 in the column of nozzles 16 as the print head 12 makes a complete pass across the image 8. The estimation of required pass buffer space is based at least in part on a probability function associated with the image data compression technique. It is an estimation since the actual amount of data describing a particular swath of an image is generally not known until decompression is complete. However, the sizing of the pass buffer must be accomplished before decompression is complete so that the buffer will be ready to receive the decompressed data.

Before printing the next swath of the image 8, the controller 4 determines the available capacity of the pass buffer 26 (step 106). Based on the required memory space and the current available capacity of the pass buffer 26, the controller 4 calculates a value ratio, (step 108) according to:

$$ratio_1 = \frac{\text{current available capacity of the memory device}}{\text{memory space needed to hold data required to print a swath using all } n \text{ nozzles}} \quad (7)$$

Preferably, the controller 4 also computes an estimate for the amount of image data received from the host computer 6 after decompression of the data (step 110). Based on the amount of image data received from the host computer 6 and the amount of data that represents a full swath of data, the controller 4 calculates a value $ratio_2$ (step 112) according to:

$$ratio_2 = \frac{\text{amount of image data received from the host}}{\text{amount of image data required to print a swath using all } n \text{ nozzles}} \quad (8)$$

The controller then computes a value ratio to be the smaller of $ratio_1$ and $ratio_2$ (step 114) according to:

$$ratio = \min[ratio_2, ratio_1]. \quad (9)$$

Preferably, if ratio is less than a predetermined minimum value, then operation of the print head is paused.

Prior to printing the next swath of the image 8, the controller 4 calculates a number m of nozzles 14 to be used in printing the swath. Depending on the value of ratio, the number m may equal n, which is the total number of nozzles 14 in a column 16 on the print head 12, or m may be less than n. If ratio is less than one (step 116), m is determined by:

$$m \leq ratio \times n. \quad (10)$$

If ratio is greater than or equal to one (step 118), $$m = n. \quad (11)$$

The controller 4 reorders the image data into consecutive vertical slices 25 of m pixels 23, corresponding to m adjacent nozzles 14, thus reformatting the image data into swath data 7. Preferably, the m adjacent nozzles are the m uppermost nozzles in the column 16.

The controller 4 transfers the swath data 7, describing the pixels 23 to be printed using the m nozzles 14 determined above, to the pass buffer 26. Thus, the amount of swath data 7 transferred to the pass buffer 26 at any one time is no larger than the capacity of the buffer 26. In this manner, the present invention avoids buffer overflow and carrier movement stalls. The swath data 7 remains in the pass buffer 26 until the appropriate time during the printing of the image 8 at which the data is transferred to the print head 12 (step 120).

As the swath data 7 is transferred from the buffer 26 to the print head 12, if the value ratio is greater than the predetermined minimum value, the print head 12 scans across the print medium 10 while activating the m nozzles 14 according to the swath data 7 (step 122). The m activated nozzles 14 thereby print a swath of the image, which is either a full swath or a partial swath, depending on the value of m.

At the completion of a swath, the printer controller 4 sends an advance command to a print medium advance mechanism 28 to cause the print medium 10 to be advanced in the direction indicated by the arrow 30, as shown in FIG. 1. In a preferred embodiment of the invention, the print medium advance mechanism 28 is a stepper motor rotating a platen which is in contact with the print medium 10. Between swaths, the print medium 10 is advanced by a distance of $$d \times m, \quad (12)$$

where d is the vertical spacing between adjacent nozzles 14 in the column 16. Thus, between printing of the previous swath and the printing of the next swath, the print medium 10 is advanced by the vertical height of the previous swath (step 124). The printer 2 then repeats the above procedure to print subsequent swaths until the image 8 has been completely printed.

Figure 4A:
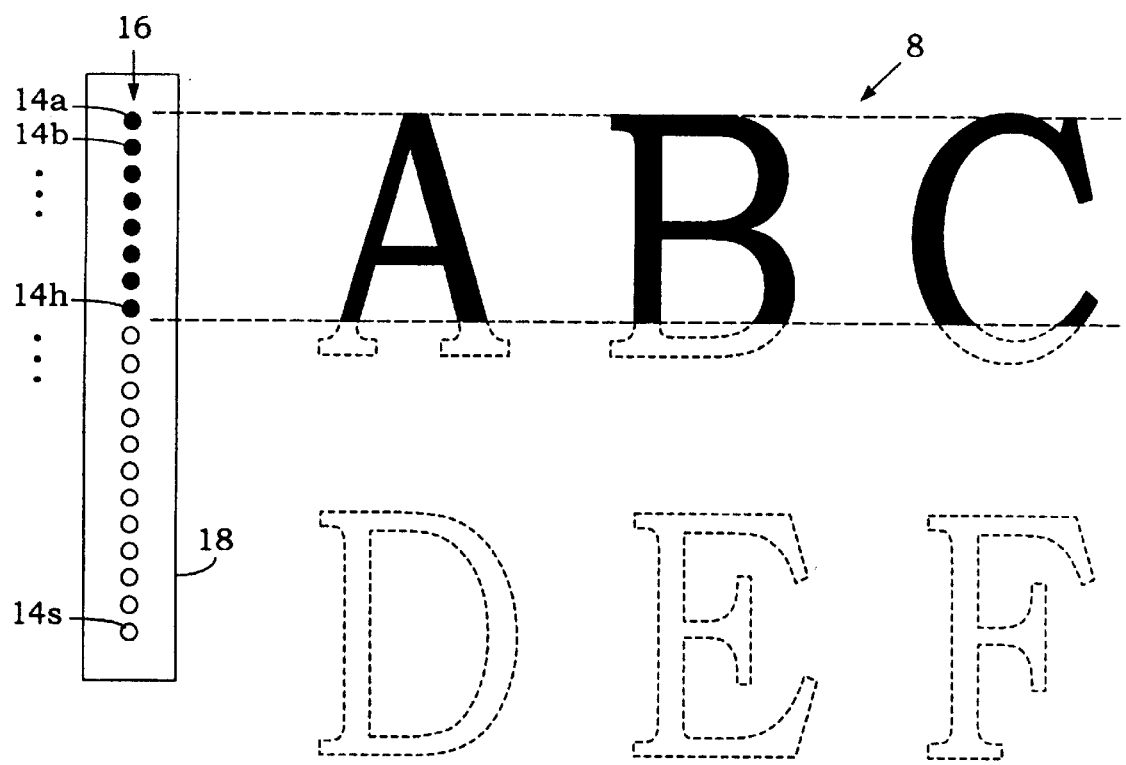
FIGS. 4A and 4B depicts a method of printing an image using a column of ink jet nozzles according to a preferred embodiment of the present invention.
Figure 4B:
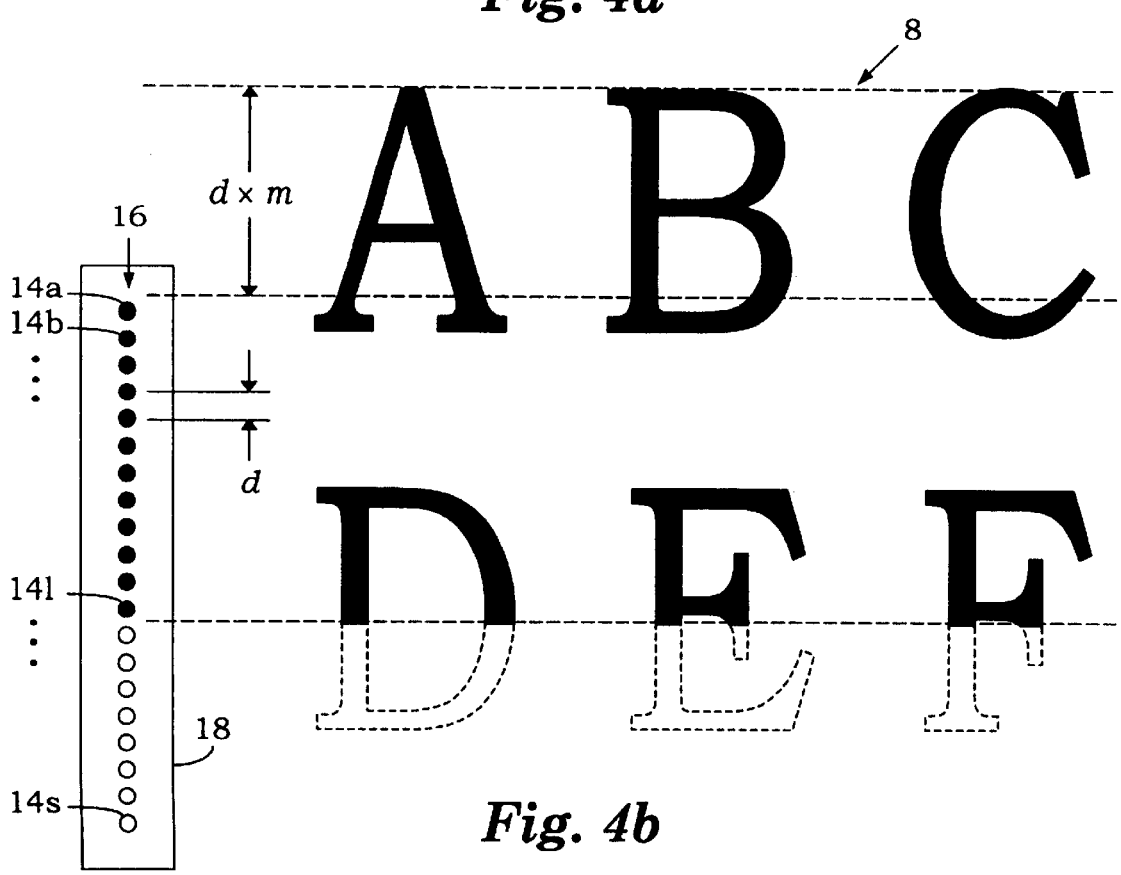

An example of the printing method of the present invention is illustrated in FIGS. 4a and 4b. FIGS. 4a and 4b depict a nozzle plate 18 of a print head 12 having a column 16 of nozzles 14a–14s. Although the print head 12 of this example has only twenty nozzles 14a–14s (n=20), it will be appreciated that the invention applies to any number of nozzles 14. Shown on the right side of FIG. 4a is the image 8 to be printed by the print head 12.

As the controller 4 receives the image data describing the image 8 from the host computer 6, the controller 4 estimates how much memory space would be required in the pass buffer 26 to hold a full swath of data 7. In this example, a full swath of data is the amount of data required to activate the twenty nozzles 14a–14s as the print head 12 makes a complete pass across the print medium 10. For purposes of this example, the controller 4 estimates that a memory space of 200 Kbytes is required to hold a full swath of data 7, and determines that the current available capacity of the pass buffer 26 is 80 Kbytes. Based on the required memory space and the current available capacity of the pass buffer 26, the controller 4 calculates ratio, to be:

$$ratio_1 = \frac{80 \text{ Kbytes}}{200 \text{ Kbytes}} = 0.40. \tag{13}$$

Based upon the image data received from the host 6 being 200 Kbytes, the controller 4 calculates $ratio_2$ to be:

$$ratio_2 = \frac{200 \text{ Kbytes}}{200 \text{ Kbytes}} = 1.0. \tag{14}$$

Since the present value of ratio, is less than $ratio_2$, according to equation (3), the value of ratio is 0.4. The value of ratio, 0.4, is then compared to the predetermined minimum value, which in this example is 0.2. Since ratio in this case is not less than the predetermined minimum value, the print head 12 is not paused, and processing of the image data continues as described below.

Since ratio is less than one, the controller 4 determines the number of nozzles 14 to use to print the swath of the image 8 according to:

$$m \leq ratio \times n = 0.40 \times 20 = 8. \tag{15}$$

Thus, to avoid buffer overflow, the printer 2 will use no more than eight of the nozzles 14 to print the first swath of the image 8. Preferably, as indicated by the solid black circles in FIG. 4a, the printer uses the top eight nozzles 14a–14h.

The controller 4 reorders a first portion of the image data into consecutive vertical slices 25 of eight pixels 23 each, corresponding to the eight adjacent nozzles 14a–14h, thus reformatting the image data into swath data 7, and transfers the swath data 7 to the pass buffer 26. Thus, the amount of swath data 7 transferred to the pass buffer 26 is 80 Kbytes, which is no larger than the available capacity of the buffer 26. The swath data 7 remains in the pass buffer 26 until the appropriate time during the printing of the image 8 when it is transferred to the print head 12.

As the swath data 7 is transferred from the buffer 26 to the print head 12, the print head 12 scans across the print medium 10 while activating the nozzles 14a–14h according to the swath data 7. In this manner, the eight activated nozzles 14a–14h print a partial swath of the image 8, as shown in FIG. 4a.

After printing the first swath, the printer controller 4 sends an advance command to the print medium advance mechanism 28 to cause the print medium 10 to advance upward by $$d \times m = d \times 8, \tag{16}$$

relative to the print head 12. Thus, as shown in FIG. 4b, between the printing of the first and second swaths of the image 8, the print medium 10 is advanced by the vertical height of the first swath. Continuing with the example of FIGS. 4a and 4b, the controller 4 estimates how much pass buffer memory space would be required to hold a full swath of swath data 7 describing the next portion of the image 8. Again, for purposes of this example, the controller 4 estimates that a memory space of 200 Kbytes is required to hold the next full swath of swath data 7, and determines the current available capacity of the pass buffer 26 to be 300 Kbytes. The amount of image data received from the host computer 6 is 120 Kbytes. Based on the required memory space and the current available capacity of the pass buffer 26, the controller 4 calculates $ratio_1$, $ratio_2$, and ratio to be:

$$ratio_1 = \frac{300 \text{ Kbytes}}{200 \text{ Kbytes}} = 1.5 \tag{17}$$

$$ratio_2 = \frac{120 \text{ Kbytes}}{200 \text{ Kbytes}} = 0.6 \tag{18}$$

$$ratio = \min[ratio_2, ratio_1] = 0.6. \tag{19}$$

Again, since 0.6 is not less than the predetermined minimum value of 0.2, the print head operation is not paused.

Since ratio is again less than one, the controller 4 determines the number of nozzles to use to print the next swath of the image according to:

$$m \leq ratio \times n = 0.60 \times 20 = 12 \text{ nozzles}. \tag{20}$$

So, to print the next swath of the image 8, the printer 2 will use no more than twelve adjacent nozzles 14, such as the nozzles 14a–14l.

The controller 4 reorders a second portion of the image data into consecutive vertical slices of twelve pixels 23 each, corresponding to the twelve adjacent nozzles 14a–14l, thereby reformatting the second portion of image data into a second swath of data 7. The controller 4 transfers the second swath of data to the pass buffer 26. Again, the amount of swath data 7 transferred to the pass buffer 26, 120 Kbytes, is no larger than the available capacity of the buffer 26. As the second swath of swath data 7 is transferred from the buffer 26 to the print head 12, the print head 12 scans across the print medium 10 while activating the nozzles 14a–14l according to the swath data 7. Thus, the twelve activated nozzles 14a–14l print the second partial swath of the image 8, as shown in FIG. 4b.

As the above example indicates, using the method of the present invention, the print head 12 need not stop during or between passes to wait for the pass buffer 26 to reload. By avoiding undesirable pauses in the printing of an image, the invention provides for consistent ink drying times from pass to pass. In this manner, the partially dried ink at the edge of the previously printed swath "knits" together with the newly-applied ink at the edge of the current swath in a consistent manner from one pass to the next. This improves the overall printed image quality.

In an alternate embodiment of the invention, the value of ratio is determined based on $ratio_1$ only. Thus, in this alternate embodiment, the value of ratio used in equations (10) and (11) to determine the value of m is determined by setting ratio equal to $ratio_2$.

In yet another alternate embodiment, the value of ratio is determined based on $ratio_2$ only. With this alternate embodiment, the value of ratio used in equations (10) and (11) is determined by setting ratio equal to $ratio_2$.

It is contemplated, and will be apparent to those skilled in the art from the preceding description and the accompanying drawings that modifications and/or changes may be made in the embodiments of the invention. Accordingly, it is expressly intended that the foregoing description and the accompanying drawings are illustrative of preferred embodiments only, not limiting thereto, and that the true spirit and scope of the present invention be determined by reference to the appended claims.

What is claimed is:

1. A method for transferring image data that describes an image to an ink jet print head, and printing the image on a print medium, where the print head has n number of nozzles in an array for sequentially ejecting columns of ink droplets onto the print medium as the print head scans across the print medium, and where the columns of ink droplets ejected during a single scan of the print head across the image collectively comprise a swath of the image, the method comprising the steps of:

(a) receiving the image data from a data source;
   (b) determining an amount of the image data required to print a swath using all n of the nozzles;
   (c) calculating a ratio having a value that depends in part upon the amount of the image data required to print a swath using all n of the nozzles; and
   (d) transferring to the print head a portion of the image data that describes a swath of the image to be printed using a number m of the nozzles, where:

m≦ratio×n, for ratio≦1, and m=n, for ratio≧1.

2. The method of claim 1 wherein the step (d) of transferring to the print head a portion of the image data further comprises:

(e) transferring to a memory device the portion of the image data that describes the swath of the image to be printed using a number m of the nozzles; and
   (f) transferring from the memory device to the print head the portion of the image data that describes the swath of the image to be printed using the m number of the nozzles.

3. The method of claim 1 further comprising:

(e) if ratio is greater than a predetermined minimum value, printing the swath of the image on the print medium using the m number of the nozzles.

4. The method of claim 2 further comprising:

(g) determining a current available capacity of the memory device;
   (h) determining an amount of memory space needed to hold the amount of data required to print a swath using all n of the nozzles; the step (c) of calculating a ratio further comprising:
   (c1) calculating a $ratio_1$ according to:

$$ratio_1 = \frac{\text{current available capacity of the memory device}}{\text{memory space needed to hold data required to print a swath using all } n \text{ nozzles}},$$

and (c2) setting ratio equal to $ratio_1$.

5. The method of claim 1 further comprising:

(e) determining an amount of the image data received from the data source; and
   the step (c) of calculating a ratio further comprising:
   (c1) calculating a $ratio_2$ according to:

$$ratio_2 = \frac{\text{amount of image data received from the data source}}{\text{amount of image data required to print a swath using all } n \text{ nozzles}}, \text{ and}$$

(c2) setting ratio equal to $ratio_2$.

6. The method of claim 2 further comprising:

(g) determining a current available capacity of the memory device;
   (h) determining an amount of memory space needed to hold the amount of data required to print a swath using all n of the nozzles;
   (i) determining an amount of the image data received from the data source; and the step (c) of calculating a ratio further comprising:
   (c1) calculating a $ratio_1$ according to:

$$ratio_1 = \frac{\text{current available capacity of the memory device}}{\text{memory space needed to hold data required to print a swath using all } n \text{ nozzles}},$$

(c2) calculating a $ratio_2$ according to:

$$ratio_2 = \frac{\text{amount of image data received from the data source}}{\text{amount of image data required to print a swath using all } n \text{ nozzles}}, \text{ and}$$

(c3) setting ratio equal to the lesser of $ratio_1$ and $ratio_2$.

7. The method of claim 3 further comprising:

(f) repeating the steps (a)–(e) to print subsequent swaths of the image; and
   (g) between each swath of the image, advancing the print medium relative to the print head by at least d times m, where d is a spacing between adjacent nozzles, and m is the number of nozzles used in printing the immediately preceding swath.

8. The method of claim 3 wherein the step of printing the swath of the image further comprises using contiguous nozzles within the nozzle array to eject the ink droplets.

9. A method for transferring image data that describes an image to an ink jet print head, and printing the image on a print medium, where the print head has n number of nozzles in an array for sequentially ejecting columns of ink droplets onto the print medium as the print head scans across the print medium, and where the columns of ink droplets ejected during a single scan of the print head across the image collectively comprise a swath of the image, the method comprising the steps of:

(a) receiving the image data from a data source;
   (b) determining an amount of the image data received from the data source; and
   (c) determining an amount of the image data required to print a swath using all n of the nozzles;
   (d) determining an amount of memory space needed to hold the amount of data required to print a swath using all n of the nozzles;
   (e) determining a current available capacity of a memory device;

(f) calculating a value ratio, according to:

$$ratio_1 = \frac{\text{current available capacity of the memory device}}{\text{memory space needed to hold data required to print a swath using all } n \text{ nozzles}};$$

(g) calculating a value ratio$_2$ according to:

$$ratio_2 = \frac{\text{amount of image data received from the data source}}{\text{amount of image data required to print a swath using all } n \text{ nozzles}};$$

(h) setting a value ratio equal to the lesser of ratio$_1$ and ratio$_2$;

(i) transferring to the memory device a portion of the image data that describes a swath of the image to be printed using a number m of the nozzles, where:

m≦ratio×n, for ratio<1, and m=n, for ratio≧1;

(j) transferring from the memory device to the print head the portion of the image data that describes the swath of the image to be printed using the m number of the nozzles;

(k) if ratio is greater than a predetermined minimum value, printing the swath of the image on the print medium using the m number of contiguous nozzles within the nozzle array;

(l) advancing the print medium relative to the print head by at least d times m, where d is a spacing between adjacent nozzles, and m is the number of nozzles used in printing the immediately preceding swath; and (m) repeating the steps (a)–(l) to print subsequent swaths of the image.

10. An ink jet printer for forming an image on a print medium based on image data received from an image data source, the printer comprising:

a print head having n number of nozzles in an array for ejecting columns of ink droplets onto the print medium as the print head passes across the print medium, where the columns of ink droplets ejected during a single pass of the print head across the image collectively comprise a swath of the image;

a memory device having a current available capacity for storing swath data to be transferred to the print head, where the swath data describes a swath of the image; and a controller for determining an amount of the image data required to print a swath of the image using all n of the nozzles, for calculating a ratio having a value that depends in part upon the amount of the image data required to print a swath using all n of the nozzles, for transferring to the memory device a portion of image data that describes a swath of the image to be printed using a number m of the nozzles, where m≦ratio×n, for ratio<1, and m=n, for ratio≧1.

11. The printer of claim 10 wherein the controller is further operable to determine a current available capacity of the memory device, to determine an amount of memory space needed to hold the amount of data required to print a swath using all n of the nozzles, to calculate a ratio$_1$ according to:

$$ratio_1 = \frac{\text{current available capacity of the memory device}}{\text{memory space needed to hold data required to print a swath using all } n \text{ nozzles}},$$

and to set ratio equal to ratio$_1$.

12. The printer of claim 10 wherein the controller is further operable to determine an amount of the image data received from the data source, to calculate a ratio$_2$ according to:

$$ratio_2 = \frac{\text{amount of image data received from the data source}}{\text{amount of image data required to print a swath using all } n \text{ nozzles}},$$

and to set ratio equal to ratio$_2$.

13. The printer of claim 10 wherein the controller is further operable to determine a current available capacity of the memory device, to determine an amount of memory space needed to hold the amount of data required to print a swath using all n of the nozzles, to determine an amount of the image data received from the data source, to calculate a ratio$_1$ according to:

$$ratio_1 = \frac{\text{current available capacity of the memory device}}{\text{memory space needed to hold data required to print a swath using all } n \text{ nozzles}},$$

to calculate a ratio$_2$ according to:

$$ratio_2 = \frac{\text{amount of image data received from the data source}}{\text{amount of image data required to print a swath using all } n \text{ nozzles}}, \text{ and}$$

to set ratio equal to the lesser of ratio$_1$ and ratio$_2$.

14. The printer of claim 10 wherein the controller is further operable to transfer from the memory device to the print head the portion of the image data that describes the swath of the image to be printed using the m number of the nozzles, and to determine whether ratio is greater than a predetermined minimum value; and the print head is further operable to print the swath of the image on the print medium using the m number of the nozzles if ratio is greater than the predetermined minimum value.

15. The printer of claim 10 further comprising:

the controller further for generating a carriage drive command based on the image data;

a carriage attached to the print head for enabling movement of the print head adjacent the print medium;

a carriage drive mechanism connected to the carriage for receiving the carriage drive command and causing the carriage to move the print head adjacent the print medium;

the print head further for ejecting droplets of ink from the array of m nozzles as the print head moves adjacent the print medium, thereby printing the swath of the image on the print medium.

16. The printer of claim 10 further comprising:

the print head having a spacing d between adjacent nozzles in the vertical array;

the controller for generating a print medium advance command based on the image data; and a print medium advance mechanism for receiving the print medium advance command and advancing the print medium relative to the print head by at least d times m based on the print medium advance command, where m is the number of nozzles used in printing an immediately preceding swath.

17. An ink jet printer for forming an image on a print medium based on image data received from an image data source, the printer comprising:

a print head having n number of nozzles with a spacing d between adjacent nozzles in a vertical array, the nozzles for ejecting vertical columns of ink droplets onto the print medium as the print head passes horizontally across the print medium, where the vertical columns of ink droplets ejected during a single pass of the print head across the print image is collectively comprise a swath of the image;

a memory device having a current available capacity for storing swath data to be transferred to the print head, where the swath data describes a swath of the image; and a controller for determining an amount of the image data required to print a swath of the image using all n of the nozzles, for determining a current available capacity of the memory device, for determining an amount of memory space needed to hold the amount of data required to print a swath using all n of the nozzles, for determining an amount of the image data received from the data source, for calculating a $ratio_1$ according to:

$$ratio_1 = \frac{\text{current available capacity of the memory device}}{\text{memory space needed to hold data required to print a swath using all } n \text{ nozzles}},$$

for calculating a $ratio_2$ according to:

$$ratio_2 = \frac{\text{amount of image data received from the data source}}{\text{amount of image data required to print a swath using all } n \text{ nozzles}},$$

for setting ratio equal to the lesser of $ratio_1$ and $ratio_2$, for transferring to the memory device a portion of image data that describes a swath of the image to be printed using a number m of the nozzles, where $m \leq ratio \times n$, for ratio<1, and $m=n$, for ratio$\geq$1, for transferring from the memory device to the print head the portion of the image data that describes the swath of the image to be printed using the m number of the nozzles, for determining whether ratio is greater than a predetermined minimum value, for generating a carriage drive command based on the image data if ratio is greater than the predetermined minimum value, and for generating a print medium advance command based on the image data;

a carriage attached to the print head for enabling horizontal movement of the print head adjacent the print medium;

a carriage drive mechanism connected to the carriage for receiving the carriage drive command and causing the carriage to move the print head adjacent the print medium in a horizontal direction;

the print head further for ejecting droplets of ink from the vertical array of m nozzles as the print head moves adjacent the print medium, thereby printing the swath of the image on is the print medium; and a print medium advance mechanism for receiving the print medium advance command and vertically advancing the print medium relative to the print head by at least d times m based on the print medium advance command, where m is the number of nozzles used in printing an immediately preceding swath.

* * * * *

UNITED STATES PATENT AND TRADEMARK OFFICE
CERTIFICATE OF CORRECTION

PATENT NO. : 6,247,786 B1  
DATED : June 19, 2001  
INVENTOR(S) : James Ronald Booth et al.

Page 1 of 1

It is certified that error appears in the above-identified patent and that said Letters Patent is hereby corrected as shown below:

Column 11,
Line 1, "ratio," should read -- $ratio_1$, --.

Column 14,
Line 36, "is" should be deleted.

Signed and Sealed this

Ninth Day of April, 2002

Attest:

JAMES E. ROGAN
*Attesting Officer*     *Director of the United States Patent and Trademark Office*